United States Patent [19]
Todd

[11] Patent Number: 4,758,284
[45] Date of Patent: Jul. 19, 1988

[54] CUTTING APPARATUS RECEPTACLE DEVICE AND METHOD OF USING SAME

[76] Inventor: Thomas W. Todd, 10161 Royal Ann Ave., San Diego, Calif. 92126

[21] Appl. No.: 42,462

[22] Filed: Apr. 23, 1987

[51] Int. Cl.⁴ .............................................. B23K 7/00
[52] U.S. Cl. ...................................... 148/9 R; 266/49
[58] Field of Search ........................... 148/9 R; 266/49

[56] References Cited

U.S. PATENT DOCUMENTS 4,358,091 11/1982 Talanda .................................. 266/49

Primary Examiner—Wayland Stallard

[57] ABSTRACT

In a cutting system, a cutting system receptacle device and method of using it for receiving a cutting jet emerging from a work piece being cut, as well as receiving and retaining waste materials or debris. A cutting system receptacle device includes a generally hollow opened-top container, partially filled with a fluid such as water, for receiving and absorbing, at least partially, the heat and energy of the impinging waste materials. A diverter on the inside bottom wall of the receptacle, separates the flow of excess material into two substantially symmetrical, side-by-side, interior chambers of the receptacle. A plurality of deflectors, direct upwardly flowing streams within the receptacle, back downwardly therewithin, for causing them to be retained therewithin. A stand pipe maintains the level of the fluid inside the receptacle device at a predetermined optimal height for a given cutting operation.

17 Claims, 1 Drawing Sheet

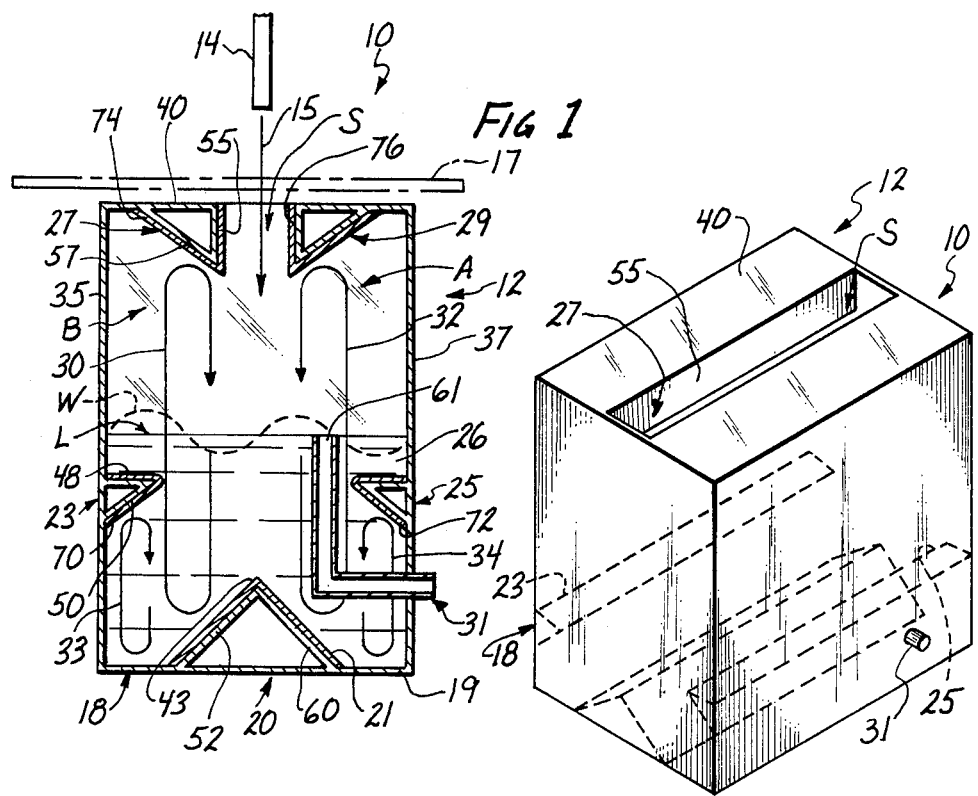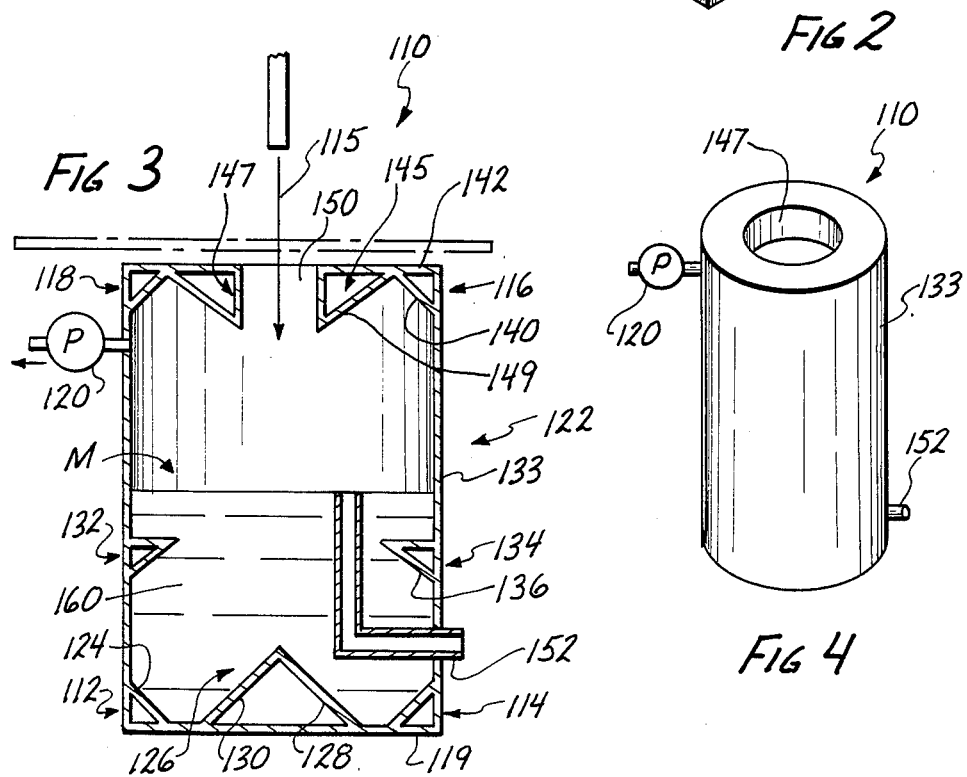

CUTTING APPARATUS RECEPTACLE DEVICE AND METHOD OF USING SAME

DESCRIPTION

1. Technical Field

The present invention relates generally to cutting apparatus such as water jet, flame or laser cutting equipment. The present invention relates more particularly to a cutting apparatus receptacle device and a method of using it, for receiving waste materials from cutting operations.

2. Background Art

Conventional techniques for cutting work pieces such as glass panels, include subjecting the work piece to a jet of fluid, such as a jet of water, under very high pressure. The jet pressure may be as high as 60,000 psi. Other conventional cutting techniques for glass and other materials, include flame cutting, such as gas plasma cutting, and laser cutting. Such cutting techniques inherently utilize a generally high power, high temperature cutting jet or beam. Upon impact with the work piece, a part of the fluid from the cutting stream, and/or a part of the work piece debris backsplash and splatter, while the rest of the fluid and debris is collected in a receptacle or catch container.

Conventional receptacles or catch containers basically include a tank for collecting the excess waste materials and/or debris, through a slot or other opening in the upper wall of the device. The stream and/or debris generally splash back and/or splatter on to the personnel operating the equipment, the cutting machinery, and the work piece.

The splattering may be dangerous to the operating personnel, and may be damaging to the work piece and cutting machinery. When, for instance, water is utilized as the cutting jet, the back-splashed excess waste materials or debris can cause the cutting machinery to rust, or otherwise to corrode. Additionally, the cutting jet along with the abrasive effect of entrained abrasive particles, can damage the receptacle, due to the energy absorbed thereby, and the heat dissipated therein. Thus, unwanted repair or replacement of the receptacle is necessitated.

Some generally unsuccessful attempts have been devised to dissipate the energy and temperature of the cutting jet, and of the entrained excess waste materials, as well as to reduce the backsplashing and/or splattering of debris. One such attempt includes positioning a plywood panel under the work piece, to help absorb the impact of the cutting stream passing through the work piece. While such attempt may cause some dissipation of energy and temperature, and reduction of the splattering debris, this attempt has proven to be less than totally satisfactory, in that inadequate energy and temperature dissipation results, and in that the plywood board must be replaced after each cutting operation, since it is destroyed by the powerful cutting jet.

Therefore, it would be highly desirable to have a device and method of using for overcoming the problems associated with using high energy, high temperature, conventional cutting techniques. Such device and method should greatly reduce, if not entirely eliminate dangerous working conditions for the operating personnel, or otherwise undesirable accidental contact with the cutting stream backsplash and/or work piece debris. It should absorb the kinetic energy, as well as dissipate the heat of the impinging cutting jet. The device and method should also greatly reduce the damage to the cutting machinery, work piece and the receptacle itself. Additionally, such device and method should be relatively inexpensive to manufacture, and to incorporate into existing cutting machinery.

DISCLOSURE OF INVENTION

Therefore, the principal object of the present invention is to provide a new and improved cutting apparatus receptacle device and a method of using it, for reducing greatly, if not eliminating entirely, backsplash and/or splattering of the cutting jet passing through a work piece, as well as work piece debris.

A further object of the present invention, is to provide such a new and improved cutting system receptacle device, and method, which greatly reduce the damage to the work piece, cutting machinery, and the receptacle device itself, during a cutting operation.

Yet another object of the present invention, is to provide such a new and improved cutting system receptacle device, which is relatively inexpensive to manufacture, and to incorporate into existing cutting machinery.

The above and further objects and features of the present invention are realized by providing a new and improved cutting system receptacle device and method of using it for receiving a cutting jet emerging from a work piece being cut, as well as receiving and retaining waste materials or debris.

A cutting system receptacle device includes a generally hollow opened-top container, partially filled with a fluid such as water, for receiving and absorbing, at least partially, the heat and energy of the impinging waste materials.

A diverter on the inside bottom wall of the receptacle, separates the flow of excess material into two substantially symmetrical, side-by-side, interior chambers of the receptacle. A plurality of deflectors, direct upwardly flowing streams within the receptacle, back downwardly therewithin, for causing them to be retained therewithin. A stand pipe maintains the level of the fluid inside the receptacle device at a predetermined optimal height for a given cutting operation.

In one form of the invention, the receptacle has a diverter, a pair of symmetrical side baffles, and a pair of symmetrical upper baffles. In another form of the invention, the receptacle further includes four corner baffles, two in each chamber of the receptacle, for dissipating excess heat therewithin. A pump evacuates noxious fumes from the inside of the receptacle, when flame cutting techniques are employed.

Thus, by diverting the impinging jet into a pair of generally symmetrical chambers, the kinetic energy and the heat of the jet are divided in two smaller portions. Also, by employing the side-by-side chamber configuration, should the cutting stream enter the receptacle at an angle other than 90° to the mouth of the receptacle opening, the stream flows almost entirely into one of the two chambers, where it receives and causes the dissipation of the energy and heat of the waste materials. The corner baffles further deflect the diverted streams downwardly back into the receptacle device, for retaining the debris thereinside.

Therefore, not only does the inventive receptacle absorb the kinetic energy, and dissipate the heat of the impinging cutting jet, but it also eliminates, or greatly reduces the potential danger to the operating personnel caused by the backsplashing and/or splattering debris. Furthermore, the retention of the debris inside the receptacle device, reduces the damage to the cutting machinery, and to the work piece. Additionally, the fluid inside the receptacle device and the disposition and design of the diverter and the baffles, greatly reduces the damage to the cutting machinery.

The addition of the diverter, the baffles and the stand pipe to a conventional catch container is also inexpensive, relative to the advantages presented thereby.

BRIEF DESCRIPTION OF DRAWINGS

The above mentioned and other objects and features of this invention and the manner of attaining them will become apparent, and the invention itself will be best understood by reference to the following description of the embodiments of the invention, in conjunction with the accompanying drawings, wherein:

FIG. 1 is a cross sectional side elevational view of a water jet cutting system receptacle device, which is constructed according to the present invention;

FIG. 2 is a reduced-scale pictorial view of the device of FIG. 1;

FIG. 3 is a cross sectional elevational view of a gas plasma cutting system receptacle device which is also constructed according to the present invention; and FIG. 4 is a reduced-scale pictorial view of the device of FIG. 3.

BEST MODE FOR CARRYING OUT THE INVENTION

Referring now to the drawings, and more particularly to FIGS. 1 and 2 thereof, there is shown a water jet cutting system 10 having a receptacle device 12, which is constructed according to the present invention. The jet cutting system 10 includes a nozzle 14, for directing a high pressure cutting jet 15 of fluid, such as water, onto a work piece 17, for cutting it in a desired manner. In this regard, the cutting jet 15 impinges upon, and passes through, the work piece 17.

It should be understood that while a water jet cutting apparatus is disclosed herein, other types and kinds of cutting apparatus, such as the hereinafter described gas plasma cutting apparatus shown in FIGS. 3 and 4, may also employ the inventive receptacle.

A receptacle device 12 is disposed under the work piece 17, for receiving the water jet emerging from the work piece after it passes cuttingly therethrough. Entrained waste material is also collected in the receptacle. The device 12 generally comprises a hollow, opened top container 18, and includes an elongated opening or slot S in a top wall 40 for receiving the cutting jet 15 to permit it to enter the hollow interior of the device. The container 18 is partially filled with water 26, to a predetermined level L, for absorbing the kinetic energy, and for dissipating heat, of the impinging jet 15.

An upstanding elongated diverter 20 is disposed on and extends along a bottom wall 19 of the device 12, for separating the vertically downwardly moving water jet 15 into two generally symmetrical side-by-side chambers generally indicated at A and B. The directions of the diverted streams into the chambers A and B are indicated by the arrows 32 and 34 in chamber A, and arrows 30 and 33 in chamber B.

The diverted streams circulate partly inside the contained water 26, to absorb energy and to cool the incoming water.

A pair of similar side or lateral upwardly sloping baffles 23 and 25 are disposed on the inner surface of a pair of opposite side walls 35 and 37 in the chambers B and A, respectively, a short distance below the water surface level L. The side baffles 23 and 25 further deflect the diverted streams, which are indicated by the smaller looping arrows 33 and 34, within the water 26.

A pair of upper angularly extending baffles 27 and 29 depend from the inside of the top wall 40, on opposite sides of the opening S. The upper baffles 27 and 29 further deflect the upwardly directed streams back downwardly toward the water level L, as indicated by the larger looping arrows 30 and 32, within the respective chambers B and A.

The side and upper baffles 23, 25, 27 and 29 are designed, dimensioned and disposed so as to cause the diverted upward streams to be deflected downwardly, generally vertically, so as not to interfere with the impinging generally vertical jet 15. Such streams are deflected downwardly onto the diverter 20, which separates the flow and re-directs the two portions upwardly into the chambers A and B. This process of deflection and diversion continues to dampen the energy and heat of the jet 15.

The diverter 20, the side baffles 23 and 25, and the upper baffles 27 and 29, maintain the circulating streams inside the receptacle 12, and therefore the undesired and dangerous backsplash and/or splattering of the debris outside the receptacle 12 is prevented, or at least greatly inhibited.

A vertical stand pipe 31 is provided to maintain the desired level L of the water 26 inside the container 18, and permits excess water to flow out of the interior of the container under the force of gravity, to be disposed of at a remote location (not shown).

In operation, the cutting jet 15 impinges upon the work piece 17, generally perpendicularly thereto, for cutting it. The jet 15 passes through the work piece 17, and maintains its generally downward vertical trajectory through the opening S of the container 18 and into its hollow interior. The high pressure water jet 15 carries excess waste materials or debris, and flows downwardly into the water 26, and into engagement with the diverter 20.

The jet 15 is then separated by the diverter 20 into a pair of generally symmetrical streams. The diverted streams flow in a generally upward vertical direction into the chambers A and B, substantially parallel to the direction of the impinging jet 15, so as not to interfere therewith. The outer portions of the deflected streams are then deflected downwardly by the side baffles 23 and 25 as indicated by the arrows 33 and 34, the outer portions of the deflected streams flow upwardly out of the water 26 and into engagement with the upper baffles 27 and 29, which deflect the streams downwardly back into the water 26, as indicated at 30 and 32.

The device 12 absorbs the impact of the impinging jet 15 in a multiplicity of stages. Upon impact with the water surface, the jet 15 penetrates the water surface, and a part of its kinetic energy is absorbed by the surface tension of the water 26. The jet 15 then travels downwardly inside the water 26 and additional kinetic energy is absorbed thereby.

The diverter 20 then impacts with the jet 15 at its peak portion 43, and absorbs part of its kinetic energy. The diverter 20 also separates the jet 15 into two generally symmetrical streams. Each stream is then guided into a respective chamber such as the chamber A, where it is further separated into a pair of streams, as indicated by the looping arrows 30 and 33.

The smaller circulating streams, as indicated by 33 and 34 are intercepted by the side baffles 23 and 25 respectively, for causing part of their kinetic energies to be absorbed by the side baffles 23 and 25. The upward streams 30 and 32 emerge out of the water 26, and a part of their kinetic energies is absorbed thereby due to the surface tension caused by the emergence of the streams 30 and 32 at the surface level L. The streams 30 and 3 then engage the upper baffles 27 and 29, which absorb part of the impact. The streams 30 and 32 are then recycled downwardly into engagement with the surface level L for further dissipating its kinetic energy. The foregoing process of dampening gradually the energy of the jet 15 continues throughout the cutting operation.

Considering now the container 18 in greater detail with respect to FIG. 1, The container 18 is partially filled with water 26, for receiving the impinging water jet 15, which carries entrained excess waste cutting materials or debris into the container 18 for retaining it and absorbing energy and heat.

The impinging jet 15 impacts with the fluid or water 26 for causing the water 26 to absorb its energy, and to dissipate its heat. The surface of the water 26 inside the container 18 is generally maintained at a predetermined level L, by means of a stand pipe 31. The height of the stand pipe 31 is predetermined to cause the height of the water level L to be at a predetermined height for a particular cutting apparatus. The water level L should not be too high, otherwise the impact of the jet 15 will cause backsplashing to occur. On the other hand, the water level L must not be too low, otherwise the kinetic energy of the flow will not be efficiently absorbed by the water 26.

A diverter 20 includes a hollow, rigid elongated member which extends longitudinally throughout substantially the whole length of the bottom wall 19. The inverter 20 has a generally inverted V-cross sectional shape throughout its length. The diverter 20 is defined by the bottom wall 19 and by two generally similar flat sides or faces 52 and 60. Each of the sides 52 and 60 depends inwardly from the inside of the bottom wall 19, and forms a generally 45° relative thereto. The sides 52 and 62 are disposed at a substantially right angle relative to one another. The diverter 20 has a peak portion 43 which faces the opening S, the peak portion 43 is oppositely disposed relative to the opening S to cause the jet to separate into two portions, one for each chamber A and B.

The diverter 20 is covered by a replaceable cap 21, for hardening its external surface, which is continuously exposed to the erosive and abrasive effects of the impinging jet 15. The replaceable cap 21 is composed of suitable impact resistant material, such as carbide steel, iron, or other suitable protective material.

A pair of symmetrically disposed side baffles 23 and 25 depend from the inside of the walls 35 and 37 of the container 18. The side baffles 23 and 25 are mounted a short distance above the surface level L, and are generally similar in design, dimensions and construction. Thus, only the side baffle 23 will be described in greater detail.

The side baffle 23 includes a hollow elongated rigid member longitudinally extending throughout substantially the whole length of the side wall 35. The side baffle 23 has an inverted V-cross sectional shape throughout its length, such that one of its sides 48 is generally perpendicularly disposed relative to the side wall 35, and is substantially parallel to the bottom wall 19 of the container 18.

Another side 50 of the side baffle 23, is generally angularly inclined relative to the side 48, and to the side wall 35. The side or face 50 is substantially parallel to the side 52 of the diverter 20, in order to deflect the upwardly directed stream 33 downwardly about 180°. The other upward stream 34, is deflected by the side baffle 25 in a similar manner as described with respect to the side baffle 23. The side baffle 23 further redirects the upward flow downwardly for causing it to be recirculated inside the water 26.

Another pair of symmetrically disposed upper baffles 27 and 29 depend from the inside of the top wall 40. The upper baffles 27 and 29 are generally similar in design, dimensions and construction, and thus, only the upper baffle 27 will be described in greater detail.

The upper baffle 27 generally includes a rigid, hollow elongated member which extends longitudinally throughout substantially the whole length of the top wall 40. The upper baffle 27 has an inverted V-cross sectional shape throughout its length. One side 55 of the upper baffle 27 extends downwardly from, and generally rectangularly to the top wall 40, for defining one side of the opening S. Another side or face 57 of the upper baffle 27 is angularly inclined relative to the side 55 and to the top wall 40.

The side 57 is substantially parallel to the side 60 of the diverter 20, for deflecting the upwardly directed stream 30 downwardly about 180°. The other upward stream 32 is deflected by the upper baffle 29, in a similar manner as described with respect to the upper baffle 27. The upper baffle 27 further redirects the upward flow downwardly for causing it to be recirculated inside the container 18.

The side baffles 23 and 25, and the upper baffles 27 and 29 are covered with respective replaceable protective layers or caps 70, 72, 74 and 76, which are similar in composition to the protective cap 21 of the diverter 20.

An upright stand pipe 31 maintains a predetermined water level L inside the container 18, for absorbing the energy and for dissipating the heat of the impinging jet 15. The dissipated heat is in turn transmitted to the side walls 35 and 37 of the container 18. The stand pipe 31, has an adjustable height for use with various cutting operations. Alternatively, the stand pipe 31 could be specifically dimensioned for a particular application.

Special doors or inlets (not shown) are provided to enable the operator to access the inside of the container 18 for maintenance purposes.

When the impinging jet 15 impacts with the water surface, it causes a wave effect as shown in dotted lines by the surface W. Such wave effect increases the surface W of water 26, and the contact area between the water 26 and the side walls of the container 18, such as the side walls 35 and 37. Thus, the energy of the circulating streams in both chambers A and B is more efficiently absorbed by the container 18 due to the side wave effect.

In some cutting applications, the nozzle is kept stationary, while the work piece 17 moves generally perpendicularly thereto. In other applications, the nozzle 14 and the work piece 17 move relative to one another. Thus, the trajectory of the jet 15 becomes askew, and is diverted from the vertical. The resulting circulating stream is however deflected by the diverter 20, and by the side and upper baffles 23, 25, 27 and 29, in such a manner as to keep the excess waste materials or debris inside the container 18.

In the event of such askew trajectory, the jet 15 is separated into two generally non-symmetrical flows, inside the chambers A and B. Wherefore, each of the chambers A or B is designed to withstand and to dissipate the full impact of the jet 15.

Considering now the alternate gas plasma cutting system 110, with respect to FIGS. 3 and 4, it is generally similarly configured as the water jet cutting system 10. It is generally cylindrically shaped, and further includes a pair of lower corner baffles 112 and 114, the upper corner baffles 116 and 118, and the pump 120.

A cylindrically shaped container 122 is partially filled with a fluid 160, and generally includes a conically shaped diverter 126, which is similar in function to the diverter 20. The diverter 126 has four similar sides, such as the sides 128 and 130, which are angularly inclined relative to one another, and to a bottom wall 119 of the container 122.

A pair of similar inwardly sloping side annular baffles 132 and 134 are similar to the side baffles 23 and 25, and depend from the inside of the side wall 133 of the container 122. The side baffle 134 includes one side 136, which is generally parallel to the side 128 of the diverter 126, for directing the upward stream downwardly, about 180°.

The container 122 further includes a pair of central annular baffles 145 and 147, which are similar to the upper baffles 27 and 29 of the water jet cutting system 10. The upper baffle 145 includes a first side 149 which angularly depends from a top wall 142 of the container 122, for directing the upward stream downwardly, about 180°.

The lower and upper corner baffles 112, 114, 116 and 118 are annularly shaped, and are used as additional diverters or reflectors. Since the gas plasma cutting system 110 operates at very high temperatures, additional reflectors are required to dissipate the excess heat and energy of the jet 115, by providing further deflection therefor. Such additional deflection of the circulating streams inside the container 122, is provided by the corner baffles 112, 114, 116 and 118.

The lower corner baffles 112 and 114 are generally similarly designed and dimensioned, and are symmetrically oppositely disposed relative to the diverter 126. Thus, only the lower corner baffle 112 will be described in greater detail.

The lower corner baffle 12 includes an elongated rigid annular member 124, which is angularly inclined relative to the side wall 135, and to the bottom wall 119 for causing the circulating streams to be deflected in a generally vertical direction, parallel to the impinging stream 115.

The upper corner baffles 116 and 118 are generally similarly designed and dimensioned, and are symmetrically disposed relative to a central opening 150 of the top wall 142. Thus, only the upper corner baffle 116 will be described in greater detail.

The upper corner baffle 116, generally includes an annular member 140 which depends angularly from the top wall 142 and from the wall 133. The annular member 140 generally depends perpendicularly from the side 149 of the upper baffle 145.

A pump 120 is connected to the side wall 133 of the container 122, above the water surface level M, and close to the top wall 142, for evacuating the noxious gasses which tend to build up inside the container 122, between the top wall 142 and the surface of the fluid 160.

An upright stand pipe 152 is similar in construction to the stand pipe 31, and controls the height of the fluid 160 inside the container 122.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In a cutting apparatus, a receptacle device for receiving an impinging jet and waste materials and debris entrained thereby, comprising:
   a generally hollow elongated container, having a bottom wall, a top wall, and at least one side wall interconnecting said bottom wall and said top wall;
   said top wall having a longitudinal central opening;
   a fluid partially filling said container, for absorbing the heat and energy of the impinging jet and waste materials;
   means for diverting the flow of the jet into two substantially symmetrical streams, said diverting means being disposed on the bottom wall of said container for separating said container into two generally symmetrical side-by-side chambers, each one of said streams being diverted into one of said chambers; and
   means for deflecting the diverted streams about 180°, for redirecting them inside said container.

2. A receptacle device for receiving an impinging jet and waste materials and debris entrained thereby, comprising:
   a generally hollow elongated container, having a bottom wall, a top wall, and at least one side wall interconnecting said bottom wall and said top wall;
   said top wall having a longitudinal central opening;
   a fluid partially filling said container, for absorbing the heat and energy of the impinging jet and waste materials;
   means for diverting the flow of the jet into two substantially symmetrical streams, said diverting means being disposed on the bottom wall of said container for separating said container into two generally symmetrical side-by-side chambers, each one of said streams being diverted into one of said chambers; and
   means for deflecting the diverted streams about 180°, for redirecting them inside said container.

3. A receptacle device according to claim 2, wherein said diverting means includes a hollow, rigid elongated member, extending longitudinally throughout substantially the whole length of said bottom wall;
   said hollow member having a generally inverted V-cross sectional shape, and a pair of generally similar faces disposed angularly relative to one another for forming a peak portion; and
   said peak portion being oppositely disposed relative to said opening so as to cause the jet to separate into two portions, one for each of said chambers.

4. A receptacle device according to claim 3, wherein said hollow member is covered with a replaceable cap.

5. A receptacle device according to claim 4, wherein said replaceable cap is composed of suitable impact resistant material, selected from the group consisting of one of carbon steel and iron.

6. A receptacle device according to claim 2, wherein said container includes a pair of substantially similar side walls,
   wherein said central opening is substantially parallel to said side walls, and
   wherein said deflecting means includes a plurality of side baffles depending inwardly from said side walls, for deflecting in a generally downward vertical direction, said diverted streams, in order to retain substantially the entire impinging jet and waste materials inside said container.

7. A receptacle device according to claim 6, wherein said deflecting means includes a pair of generally similar side baffles, being substantially symmetrically and oppositely disposed relative to said diverting means, about midway between said bottom wall and said top wall.

8. A receptacle device according to claim 7, wherein each of said side baffles includes a hollow, elongated rigid member extending longitudinally throughout substantially the whole length of said side wall; and
   said hollow member having a generally inverted V-cross sectional shape, and including a pair of generally similar faces depending angularly relative to one another.

9. A receptacle device according to claim 8, wherein one of said faces is generally perpendicularly disposed relative to said side wall; and
   the other face of said member is substantially parallel to said bottom wall.

10. A receptacle device according to claim 7, wherein said deflecting means includes a plurality of upper baffles, depending inwardly from said top wall, for deflecting in a generally downward vertical direction said diverted streams in order to retain substantially the entire impinging jet and the waste materials inside said container.

11. A receptacle device according to claim 10, wherein said deflecting means includes a pair of generally similar upper baffles being disposed substantially symmetrically oppositely relative to said opening.

12. A receptacle device according to claim 11, wherein each of said side and upper baffles are coated with a layer of protective material.

13. A receptacle device according to claim 2, further including an upright stand pipe for maintaining the fluid level inside said container at a predetermined height.

14. A receptacle device according to claim 2, further including a plurality of corner baffles being disposed on at least one corner of said container.

15. A receptacle device according to claim 14, wherein said container is substantially cylindrically shaped, and has one cylindrical side wall; and
   wherein said side baffles, upper baffles and corner baffles are annularly shaped.

16. A receptacle device according to claim 2, further comprising a pump disposed above the fluid level, for evacuating noxious fumes from the inside of said container.

17. A method for using the container device of claim 2, comprising:
   flowing a cutting jet or stream inside said container, through said opening;
   diverting said jet and separating it into two substantially symmetrical streams, one into each one of said chambers; and
   deflecting said diverted streams cyclically inside said container for dampening the impact of the jet.

* * * * *

UNITED STATES PATENT AND TRADEMARK OFFICE
CERTIFICATE OF CORRECTION

PATENT NO. : 4,758,284

DATED : Jul. 19, 1988

INVENTOR(S) : Thomas W. Todd

It is certified that error appears in the above-identified patent and that said Letters Patent is hereby corrected as shown below:

Col 5, line 10, after "30 and", please delete "3", and substitute therefor --32--.

Signed and Sealed this

Seventh Day of March, 1989

*Attest:*

DONALD J. QUIGG

*Attesting Officer*   *Commissioner of Patents and Trademarks*